March 18, 1969  R. W. MOORE ET AL  3,433,606
BLENDING METHOD AND APPARATUS
Filed Nov. 12, 1963  Sheet 1 of 2

INVENTORS
RALPH W. MOORE
WILLIAM R. BRENNAN
BY
Oswald G. Hayes
ATTORNEY

INVENTORS
RALPH W. MOORE
WILLIAM R. BRENNAN
BY Oswald G. Hayes
ATTORNEY

United States Patent Office 3,433,606
Patented Mar. 18, 1969

3,433,606
BLENDING METHOD AND APPARATUS
Ralph W. Moore and William R. Brennan, Stamford, Conn., assignors to Mobil Oil Corporation, a corporation of New York
Filed Nov. 12, 1963, Ser. No. 322,959
U.S. Cl. 44—2
Int. Cl. G01n 33/22; B67d 5/04
9 Claims

ABSTRACT OF THE DISCLOSURE

A method and means for blending gasoline wherein the addition of an antiknock agent to a base gasoline is controlled in accordance with the flow rate and knocking propensity of the gasoline. An embodiment includes a cam follower which is positioned in accordance with the flow rate of the base gasoline, a cam which is driven at a speed responsive to the knocking propensity of the gasoline; actuation of the cam follower by the cam controls the addition of the antiknock agent to the base product. Circuitry is disclosed whereby a signal from a knock test engine periodically changes the speed at which the cam is driven.

---

This invention relates to blending techniques and, more particularly, to the blending of a product from a plurality of component products in accordance with the flow rate and a selected characteristic of at least one of the products.

The invention finds particular application in the blending of gasoline employing in-line blending of a plurality of component gasoline products. At the present time, in-line blending of gasoline, i.e., the blending together of continuously flowing products in a pipeline, is generally controlled on a flow rate basis. That is, the component products are all assumed to have unchanging or constant properties, and the composition of the blended product is maintained constant by monitoring and controlling the flow rates. The problem with such an arrangement is that it does not take into account changes in the properties or characteristics of the components, and such changes can be substantial, resulting in a substantial deviation in the characteristic of the final blended product from specification.

In the copending Weber and Heath application Ser. No. 235,060 filed Nov. 2, 1962 for Blending System, and assigned to the assignee of the present application, there is disclosed a system for blending a product from a plurality of component products, wherein the blending operation is controlled in accordance with a characteristic of at least one of the products. For example, in the blending of a fuel product, the blending of the components is in accordance with the octane number of the blended product so as to render constant this characteristic of the blended product.

Typically, however, because of limitations inherent in apparatus for blending components together to form a blended product, changes made in the proportions of the components are not reflected by a change in the characteristic of the blended product until a substantial period of time later. Due to this time lag, the control of a blending operation solely in accordance with a characteristic of the blended product may not provide good results.

The present invention overcomes this difficulty by controlling a blending operation in accordance with both the flow rate of at least one of the products and a selected characteristic of at least one of the products. Flow rate changes are detected immediately, and cause a corresponding compensating change to be made in the blending operation. Deviations in the selected characteristic of the monitored product from specification, however, which occur in spite of the control in accordance with flow rate, cause the blending operation to be further changed as such deviations are detected.

As applied to the blending of a gasoline, for example, the addition of a minor portion of an anti-knock agent to a major portion of a flowing base gasoline is controlled in accordance with the flow rate of the base gasoline as well as the propensity of the blended gasoline to "knock" or experience detonation when undergoing combustion, so as to render the knocking quality or octane number of the blended gasoline constant. This is accomplished in an illustrative embodiment of the invention by employing a cam and cam follower arrangement typically used in the control of blending in accordance with flow rate only. In such an arrangement the position of the cam follower, which determines the portion of each revolution of the cam during which the cam follower is actuated by the cam, is controlled by the flow rate of the base gasoline. The cam, normally driven at a constant speed is adapted to have its speed varied during the time that the cam follower is actuated whenever the knocking quality of the blended gasoline product deviates from specification. Actuation of the cam follower by the cam controls the addition of the anti-knock agent to the base product.

Thus, the length of time that the cam follower is actuated and the anti-knock agent is added to the base product is normally dependent only upon the position of the cam follower, i.e., upon the flow rate of the gasoline, inasmuch as the cam speed is normally constant. A change in the flow rate is reflected immediately in a change in the position of the cam follower. If the knocking quality of the blended product is detected as deviating from specification, cam speed is changed and the amount of anti-knock agent added to the base product is changed to compensate for the deviation. The new speed of the cam is maintained during cam follower actuation in subsequent revolutions of the cam unless further deviations of the knocking quality of the blended product from specification are noted, which produce still further speed changes until the specification is satisfied.

A more complete understanding of the invention may be obtained by consulting the following detailed description, which is to be read in conjunction with the appended drawings, in which.

Figure 1:
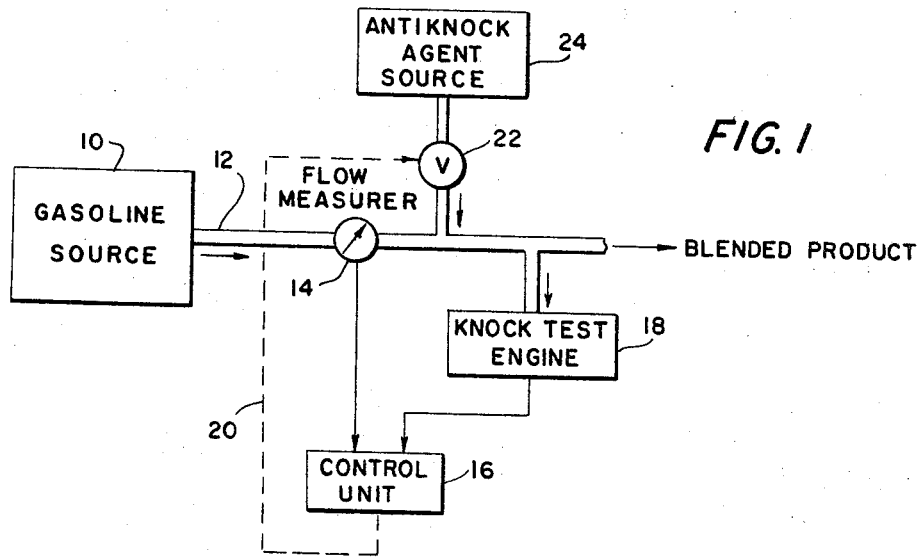
FIG. 1 is a block diagram of a representative blending system in accordance with the invention.

The following detailed description is set in the context of the blending of a gasoline, which is taken as representative. Referring to FIG. 1, a base gasoline from a source 10 is caused to flow in a pipeline 12. A flow measurer 14 measures the flow in the line 12 and provides a representation of that flow to a control unit 16. A knock test engine 18, of the type disclosed in the copending Beal application Ser. No. 295,733, filed July 17, 1963, for Automated Test and Control Apparatus, and assigned to the same assignee as the present application, is also coupled to the pipeline 12 and provides a representation of the knocking quality of the gasoline in the pipeline to the control unit 16.

The control unit 16 is coupled by a coupling 20 to a valve arrangement 22 which regulates the amount of anti-knock agent from a source 24 that is added to the base gasoline in the pipeline 12. The anti-knock agent is a non-bulk additive, the amount of the anti-knock agent being quite small in proportion to the amount of the base gasoline. The control unit regulates the valve 22 so that the anti-knock agent is added to the pipeline in accordance with both the flow rate and the knocking quality of the gasoline in the pipeline, thus to maintain the knocking quality of the blended gasoline product at a predetermined specification.

Figure 2:
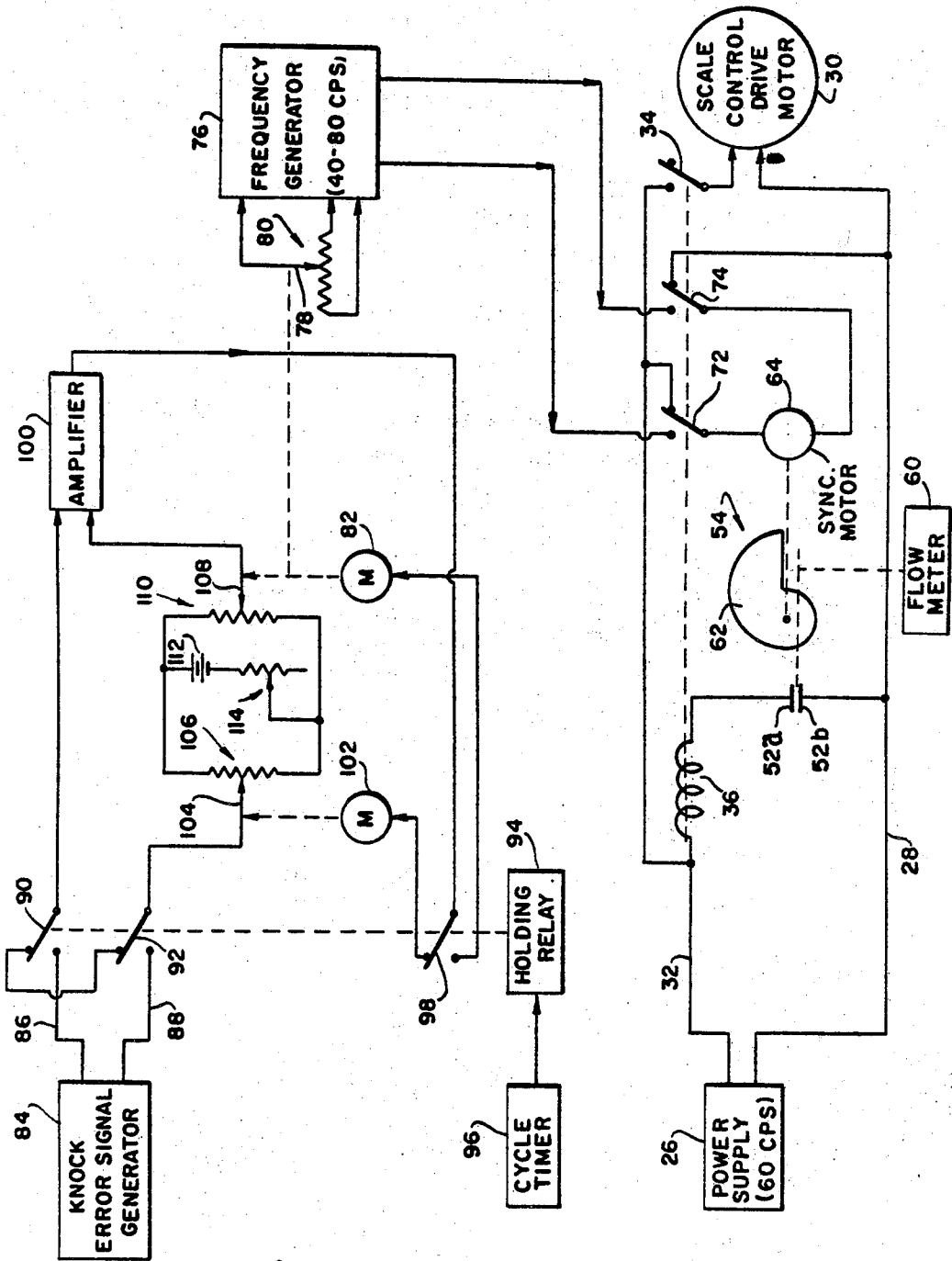
FIG. 2 is a block and schematic circuit diagram of a portion of the system of FIG. 1.

FIG. 2 shows the control unit 16 and related components in more detail. Referring to that figure, a power supply 26, typically an alternating source of potential having a frequency of 60 cycles per second, is coupled by a conductor 28 to a scale control drive motor 30. Another conductor 32 from the power supply is coupled to the motor 30 through a switch 34 whose position is determined by a control relay 36.

Figure 3:
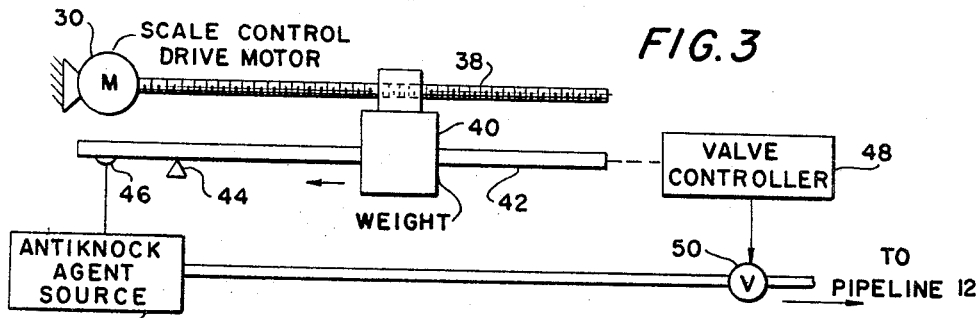
FIG. 3 is a diagram of a portion of the system of FIG. 1 showing apparatus for adding an anti-knock agent to a base gasoline.

The scale control drive motor 30 forms a portion of the valve arrangement 22 of FIG. 1, and is shown in detail in FIG. 3. Referring to that latter figure, the scale control drive motor rotates a threaded rod 38 which is threaded through a weight 40. The weight 40 is freely slidable along a bar 42 which pivots about a fulcrum 44. The anti-knock agent source 24 is suspended from a point 46 on the side of the fulcrum opposite from the weight 40. The bar 42 is coupled to a valve controller 48 which actuates a valve 50 to regulate the flow of anti-knock agent from the source 24 to the pipeline 12.

The apparatus of FIG. 3 operates so that, as the scale control drive motor 30 rotates the rod 38 and causes the weight 40 to move in the direction shown by the arrow toward the fulcrum 44, the bar 42 is caused to pivot about the fulcrum, actuating the valve controller 48 and opening the valve 50 to admit anti-knock agent from the source 24 to the pipeline 12. The valve 50 permits a sufficient amount of anti-knock agent to flow from the source 24 to restore the balance of the bar 42, at which time the valve 50 will be closed. In this fashion, the valve 50 is controlled directly in response to the changing position of the weight 40 as determined by the motor 30. Thus, in effect, the apparatus of FIG. 3 differentiates the change in weight of the anti-knock agent in the source 24 with respect to time, providing a measure of rate of flow of the anti-knock agent to the pipeline 12, which rate of flow is maintained in a prescribed ratio to the rate of flow of gasoline from the source 10.

Referring again to FIG. 2, the scale control drive motor 30 is only energized to supply anti-knock agent to the pipeline 12 when the switch 34 is actuated by the relay 36. Energization of the relay 36 is controlled by a set of normally open contacts 52a and 52b which are controlled by a cam and cam follower arrangement 54 shown in detail in FIGS. 4 and 5. Referring to these figures the contact 52b is fixed while the contact 52a is connected to an arm 56 pivotable about an axis 57. The arm 56 rests upon a cam follower 58 which is free to pivot from left to right about an axis 59a, as shown by the arrows in FIG. 4, as well as upwardly and downwardly about an axis 59b, as shown by the arrows in FIG. 5. The left-and-right movement of the cam follower 58 is determined by a flow meter 60, typically of the differential pressure type, which positions the cam follower in accordance with the flow rate in the pipeline 12. The flow meter 60, then, is a mechanical arrangement instrumenting the flow measurer 14 of FIG. 1.

Figure 4:
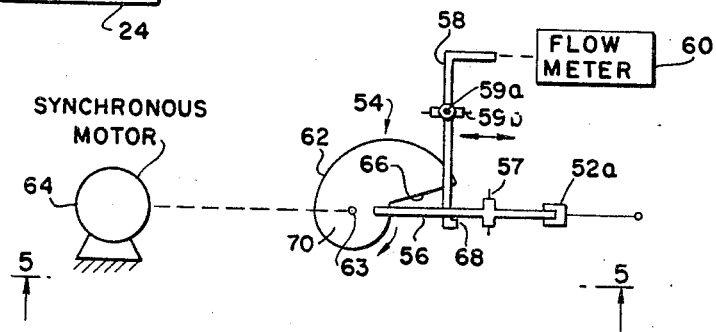
FIGS. 4 and 5 are diagrams of a cam and cam follower arrangement employed in the system of FIG. 2.
Figure 5:
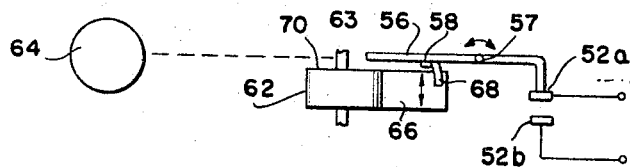

The cam follower 58 is actuated by a cam 62 which is caused to rotate in a clockwise direction about an axis 63, as shown by the arrow in FIG. 4, by a synchronous motor 64. When a leading edge 66 of the cam is urged against a shoe 68 on one end of the cam follower 58, the cam follower is pivoted upwardly so that the shoe rides upon top surface 70 of the cam, which in turn pivots the arm 56, thereby closing the contacts 52a and 52b. It will be noted that the length of time that the switch contacts 52a and 52b are closed is determined by the length of time that the cam follower shoe 68 rests upon the upper surface 70 of the cam. For a fixed speed of rotation of the cam 62, as controlled by the synchronous motor 64, this time is determined by the position of the cam follower 58. As may be seen in FIG. 4, the time that the cam follower rides upon the surface 70 of the cam increases as the cam follower shoe 68 is positioned closer to the axis of rotation 63 of the cam.

Referring again to FIG. 2, the synchronous motor 64 is normally energized by the power supply 26 through switches 72 and 74 which assume the positions shown in the figure when the relay 36 is de-energized. Thus, the synchronous motor is driven at a speed determined by the frequency of the power supply, which, in the example chosen, is 60 cycles per second. When the position of the cam 62 is such that the contacts 52a and 52b are closed, however, thereby energizing the relay 36, the switches 72 and 74 are actuated so that the synchronous motor 64 is energized by a frequency generator 76. At this time, the switch 34 is actuated and the scale control drive motor 30 is energized to add anti-knock agent from the source 24 to the pipeline 12.

The frequency generator 76, which now energizes the synchronous motor 64, typically generates an alternating potential of a frequency within the range of 40 to 80 cycles per second. The particular frequency generated is determined by the setting of movable contact 78 of potentiometer 80 that forms a portion of the frequency generator. The potentiometer 80 functions as a memory means adapted to acquire a state representative of the error signal from a knock error signal generator 84. The ratio of the flow rate of anti-knock agent to the flow rate of base gasoline is determined by the state of this memory means. The setting of the movable contact 78 is in turn determined by a motor 82 which forms a portion of a control circuit the same as that shown in FIG. 9 of the copending Beal application cited above.

To explain the operation of this circuit, a knock error signal generator 84, which may comprise the system shown in detail in FIG. 8 of the copending Beal application, generates a signal upon conductors 86 and 88 representative of the deviation of the combustion quality of the gasoline in the pipeline 12 from a predetermined standard. The conductors 86 and 88 are adapted to be respectively coupled to movable contacts 90 and 92 actuated by a holding relay 94 under the action of a cycle timer 96. The cycle timer 96 periodically energizes the holding relay, which remains energized for a predetermined period of time.

When the holding relay 94 is de-energized, the contacts 90 and 92, as well as a movable contact 98 also controlled by the holding relay, are in the positions shown in the figure. Thus, contact 98 couples the output of an amplifier 100 to a motor 102 which determines the setting of movable contact 104 of a potentiometer 106. The potentiometer contact 104 is coupled through the switch contacts 92 and 90 to the amplifier 100, the other input to which is derived from movable contact 108 of a potentiometer 110. The potentiometers 106 and 110 are suitably biased by a source of potential 112 and a potentiometer 114. The motor 102 drives the potentiometer contact 104 until the signal developed at that contact is equal to the signal developed at the potentiometer contact 108.

When the holding relay 94 is energized by the cycle timer 96, the switch 98 is actuated, thereby coupling the output of the amplifier 100 to the motor 82 which drives the potentiometer contact 108. The motor 102 is de-energized, leaving the potentiometer contact 104 fixed at its previous setting. Concurrently, the switch contact 92 is actuated, coupling the conductor 88 from the knock error signal generator 84 to the potentiometer contact 104 and rendering the potential of the contact the same as that of the conductor. At the same time, the conductor 86 is coupled through the switch contact 90 to the amplifier 100. The potentiometer contact 108 is now driven by the motor 82 until the input signals to the amplifier are rendered equal. This is accomplished when the signal from the potentiometer contact 108 is changed by an amount equal to the potential difference between the conductors 86 and 88, inasmuch as the potentiometer contacts 104 and 108 were previously adjusted so that the potentials developed at the contacts were equal. The time during which the holding relay 94 retains the switches 90, 92, and 98 in their actuated positions must be sufficiently long to ensure that this is accomplished.

In this fashion, the potentiometer contact 78, which is coupled to the motor 82, is moved so that the signal developed thereby changes by an amount proportional to the error signal generated by the knock error signal generator 84. Thus, the frequency of the potential generated by the frequency generator 76 changes in proportion to the deviation in knocking quality of the gasoline in the pipeline 12 from the predetermined standard. The change in frequency causes the speed of the synchronous motor 64 to change accordingly, which in turn changes the speed of rotation of the cam 62 when the contacts 52a and 52b are closed.

By this action, the time during which the contacts 52a and 52b remain closed to energize the relay 36 and to cause the motor 30 to add anti-knock agent to the pipeline 12 is changed to compensate for the deviation of the blended gasoline from specification. The rotational speed of the cam 62 is slowed to increase the period of time that the contacts are closed if the knocking quality or octane number of the blended gasoline is below specification. On the other hand, if the octane number is above specification, the rotational speed of the cam is increased to shorten the period of time that the contacts are closed. When the contacts 52a and 52b open by the action of the cam follower 58 dropping off the face 70 of the cam 62 (FIGS. 4 and 5), the relay 36 is de-energized causing the motor 30 to be de-energized and causing the speed of the synchronous motor 64 to be determined by the power supply 26 until the cam again actuates the cam follower to repeat the cycle.

The action of the cycle timer 96 may provide for the updating of the state of the memory means 80 and hence the changing of the frequency of the signal generated by the frequency generator 76 as often as necessary. In this regard, each time that the cycle timer energizes the relay 94, the potentiometer contact 78 is moved by an amount proportional to the error signal generated by the knock error signal generator. The time that elapses between successive energizations of the relay 94 generally should be sufficient to ensure that a change made in the amount of anti-knock agent added to the pipeline 12 is reflected in the gasoline that is sampled by the test engine 18 before the relay is again energized by the cycle timer 96.

It is apparent that a system has been described for the control of a blending operation in accordance with flow rate and product characteristic. In the embodiment described above, changes in the rate of flow of a base fuel are detected and cause the position of the cam follower 58 (FIGS. 4 and 5) to change its position and to thereby change the time during which an anti-knock agent is applied to the fuel. Changes in knocking quality change the speed of rotation of the cam 62, also to change the time during which the anti-knock agent is applied to the base fuel. As noted above, since flow rate changes are immediately reflected, whereas changes in knocking quality typically take a substantial period of time before being reflected in the blended gasoline, the control system operates to adjust the blending operation principally in accordance with flow rate. If such adjustments do not produce a gasoline of specification, deviations in knocking quality from specification are noted and changes are made accordingly.

It is apparent that the above described embodiment is susceptible of modification. Accordingly, the invention should not be deemed limited to the embodiment shown but should be determined by the following claims which define the invention.

We claim:
1. In apparatus for forming a blended product from a base product and an additive product added to the base product, including a rotating cam and a cam follower, the position of the cam follower determining the time during which the cam follower is actuated by the cam during a complete revolution of the cam, and further including means for providing a representation of the flow of at least one of said base and blended products, and means for providing a representation of a selected characteristic of said blended product, the combination comprising
    means responsive to said representation of flow for controlling one of the rate of rotation of the rotating cam and the position of the cam follower,
    means responsive to said representation of selected characteristic for controlling the other of the rate of rotation of the rotating cam and the position of the cam follower, and
    means responsive to the actuation of the cam follower by the cam for controlling the addition of the additive product to the base product.

2. Apparatus as recited in claim 1, wherein the means responsive to said representation of flow controls the position of the cam follower, and the means responsive to said representation of selected characteristic controls the rate of rotation of the rotating cam.

3. Apparatus as recited in claim 2, wherein the means responsive to said representation of selected characteristic includes
    means for normally rotating the cam at a predetermined rate of rotation, and
    means responsive to the actuation of the cam follower by the cam for varying the rate of rotation of the cam in accordance with the deviation of the representation of said selected characteristic from a standard.

4. Apparatus as recited in claim 1, wherein the blended product is a fuel product, and wherein said means responsive to the selected characteristic provides a representation of the propensity of the blended fuel product to knock when undergoing combustion.

5. In a method of forming a blended product from a base product and an additive product added to the base product, wherein the additive product is added to the base product during a portion of each of a plurality of cycles, the steps comprising
    controlling one of the time taken to complete a cycle and the amount of a cycle that constitutes said portion in accordance with the flow rate of at least one of said products, and
    controlling the other of the time taken to complete a cycle and the amount of a cycle that constitutes said portion in accordance with a selected characteristic of said blended product,
    whereby the amount of additive added to the base product during each of said cycles is determined by said flow rate and said selected characteristic.

6. In a method of controlling the confluence of a major portion of a combustible fluid in bulk and a minor portion of a non-bulk additive to form a blend, the additive affecting a combustion quality of the blend, the steps comprising
    sensing the flow rate of one of said combustible fluid and said blend,
    adjusting the flow rate of said additive to maintain the flow rates of said additive and said one of said combustible fluid and said blend in a prescribed ratio,
    generating an error signal representative of the deviation of said combustion quality from a predetermined standard,
    storing said error signal in a memory means to place said memory means in a state which is a function of said error signal, modifying said ratio in accordance with the state of said memory means, and periodically updating the state of said memory means.

7. In apparatus for forming a blended fuel product from a plurality of fuel components including at least one component that has an effect on the propensity of the blended fuel product to knock when undergoing combustion, the combination comprising in-line blending conduit means for providing a stream of the blended fuel product from streams of the fuel components, means for providing a representation of the flow rate of at least one of the blended fuel product stream and the fuel component streams, means including a knock test engine and a knock error signal generator for providing an error signal representative of the amount of deviation from a predetermined standard of the propensity of the blended fuel product to knock, means interconnecting said conduit means and said engine for providing a sample of the blended fuel product stream to said engine, memory means for storing a function of said error signal, means operatively associated with said knock error signal generator and said memory means for periodically updating the stored function of said error signal, means responsive to the flow rate representation for maintaining a prescribed flow rate of said component that has an effect on the knocking propensity of the blended fuel product, and means for modifying said prescribed flow rate in accordance with the stored function of said error signal.

8. In apparatus for forming a blended fuel product from a plurality of fuel components, the combination comprising conduit means for combining the fuel components to provide a stream of the blended fuel product, means for providing a representation of the flow rate of at least one of the blended fuel product and the fuel components, a knock test engine, motive means for adjusting the compression ratio of said engine, means interconnecting said conduit means and said engine for providing a sample of the blended fuel product stream to said engine, means coupled to said engine for generating a signal representative of knock occurring during operation of said engine on the blended fuel product sample, means responsive to a function of said knock signal for controlling said motive means to adjust the compression ratio of said engine so as to maintain a predetermined knocking condition therein, a knock error signal generator responsive to adjustment of the compression ratio for providing an error signal representative of the amount of deviation from a predetermined standard of the propensity of the blended fuel product to knock, memory means for storing a function of said error signal, means operatively associated with said knock error signal generator and said memory means for periodically updating the stored function of said error signal, and means for controlling the composition of the blended fuel product in response to the representation of flow rate and the stored function of said error signal.

9. In apparatus for forming a blended fuel product from a base fuel product and an anti-knock agent that is added to the base fuel product, the anti-knock agent having an effect on the propensity of the base fuel product to knock when undergoing combustion, the combination comprising conduit means for providing a stream of the blended fuel product by adding the anti-knock agent to a stream of the base fuel product, means for providing a representation of the flow rate of at least one of the base fuel product and the blended fuel product streams, means including a knock test engine and a knock error signal generator for providing an error signal representative of the amount of deviation from a predetermined standard of the propensity of the blended fuel product to knock, means interconnecting said conduit means and said engine for providing a sample of the blended fuel product stream to said engine, memory means for storing a function of said knock error signal, means operatively associated with said knock error signal generator and said memory means for periodically updating the stored function of said error signal, means responsive to the representation of flow rate for maintaining the flow rates of said anti-knock agent and said one of the base fuel product and blended fuel product streams in a prescribed ratio, and means for modifying said prescribed ratio in accordance with the stored function of said error signal.

References Cited

UNITED STATES PATENTS

| | | | |
|---|---|---|---|
| 2,306,372 | 12/1942 | Banks | 73—35 |
| 2,903,417 | 9/1959 | Beaugh et al. | 208—136 |

OTHER REFERENCES

"Data-Control-Special Purpose Computers in the Control of continuous processes" by Amber et al., from Automatic Control, vol. 7–8, May 1958, pp. 43 to 48.

Butler, "Automatic Blending Lives up to Goal" Petroleum Refiner, vol. 39 August 1960, pp. 97–100.

Sisk, "Automation for Gas Blending" Oil and Gas Journal, vol. 58, No. 25, June 1960, pp. 108–111.

DANIEL E. WYMAN, *Primary Examiner.*

Y. H. SMITH, *Assistant Examiner.*

U.S. Cl. X.R.

73—35; 137—3